United States Patent
Stahle et al.

(10) Patent No.: US 8,385,214 B2
(45) Date of Patent: Feb. 26, 2013

(54) METHOD AND APPARATUS FOR MITIGATING CELL OUTAGE

(75) Inventors: Per Stahle, Stockholm (SE); Niklas Isaksson, Molnlycke (SE); Andreas Olsson, Stockholm (SE); Magnus Standar, Floda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 12/808,301

(22) PCT Filed: Dec. 17, 2007

(86) PCT No.: PCT/SE2007/051011
§ 371 (c)(1),
(2), (4) Date: Jun. 15, 2010

(87) PCT Pub. No.: WO2009/078764
PCT Pub. Date: Jun. 25, 2009

(65) Prior Publication Data
US 2010/0278038 A1    Nov. 4, 2010

(51) Int. Cl.
*H04L 1/00* (2006.01)
*H04W 4/00* (2009.01)

(52) U.S. Cl. ........ 370/244; 370/218; 370/328; 709/224; 455/423

(58) Field of Classification Search .................. None
See application file for complete search history.

(56) References Cited

U.S. PATENT DOCUMENTS

| 5,852,778 A * | 12/1998 | Labedz ................ 455/423 |
| 8,200,228 B2 * | 6/2012 | Peisa et al. ............ 455/438 |
| 2004/0229621 A1 | 11/2004 | Misra |
| 2006/0084441 A1 | 4/2006 | Dowling |
| 2006/0223546 A1 | 10/2006 | Claussen |
| 2007/0225029 A1 * | 9/2007 | Abusch-Magder ....... 455/525 |
| 2009/0137265 A1 * | 5/2009 | Flore et al. ............. 455/525 |

FOREIGN PATENT DOCUMENTS

| EP | 1184937 A1 | 3/2002 |
| EP | 1748664 A2 | 1/2007 |
| GB | 2378858 A | 2/2003 |

* cited by examiner

*Primary Examiner* — Jianye Wu
(74) *Attorney, Agent, or Firm* — Coats & Bennett, P.L.L.C.

(57) ABSTRACT

Cell outage within a wireless communication network is automatically mitigated. This way, neither manual operator intervention nor manual base station reconfiguration is needed to cover problematic cells. Quality of wireless services provided by the network improves when cell outage is automatically mitigated. In one embodiment, cell outage is mitigated in a wireless communication network by automatically communicating cell status messages between radio base stations or within a node that controls the radio base stations (300) indicating whether one or more cells within the network are currently disabled or expected to be disabled. The coverage area of one or more preexisting cells is modified to cover those cells which are currently disabled or expected to be disabled as indicated by the cell status messages (302). The inter-base station interface can also be used to send messages directly between the base stations indicating addition of new cells or deletion of preexisting cells.

24 Claims, 9 Drawing Sheets

| CELL ID 500 | CELL POSITION 502 | CELL STATUS 504 |

FIG. 5

| CELL ID 500 | CELL POSITION 502 | CELL STATUS 504 | NEIGHBOR CELL LIST 600 |

FIG. 6

| NEW CELL ID 1000 | POSSIBLE NEIGHBOR CELLS 1010 | OTHER INFORMATION 1020 |
|---|---|---|

*FIG. 10*

| DELETED CELL ID 1100 | OTHER INFORMATION 1110 |
|---|---|

*FIG. 11*

METHOD AND APPARATUS FOR
MITIGATING CELL OUTAGE

TECHNICAL FIELD OF THE INVENTION

The present invention generally relates to wireless communication systems, and particularly relates to mitigating cell outage and managing neighbor lists in wireless communication systems.

BACKGROUND

A wireless communication system for communicating with mobile stations is typically divided up into a plurality of cells. While a mobile station is in one cell, it is common for the mobile station to monitor channels belonging to other nearby cells, particularly in anticipation of being handed-off to another cell. Typically, the mobile station does not monitor all possible channels, but instead monitors the channels on a so-called neighbor list. This neighbor list is typically provided to the mobile station on the control channel of a current cell by the base station serving that cell. Thus, each base station transmits a neighbor list to the mobile stations that are using that cell, based on a stored neighbor list for that cell. As cells are added or deleted, the contents of the stored neighbor lists need to be updated to reflect the new arrangements, so that the mobile stations are provided with correct neighbor list information. Moreover, cells may become disabled for various reasons such as hardware failure, power failure, low power supply, etc. Lengthy cell outages disrupt network services unless mitigated.

SUMMARY

According to the methods and apparatus taught herein, cell outage within in a wireless communication network is mitigated automatically. This way, neither manual operator intervention nor manual base station reconfiguration is needed to cover disabled cells. The quality of wireless services provided by the network improves when cell outage is automatically mitigated. Cell outage is mitigated by monitoring cell activity and automatically communicating cell status messages based on the monitoring results. The cell status messages are communicated to radio base stations serving the cells and indicate whether there are any problematic cells within the network. Base stations that receive these messages use them to determine whether the coverage area of one or more of their preexisting cells can be modified to cover problematic neighbor cells identified in the message. The coverage area of a preexisting cell can be modified to cover a problematic cell by adjusting antenna position or increasing cell transmit power. Either way, the cell status messages may be automatically communicated within the node that controls the base stations such as within the node controlled by a radio network controller in a Wideband CDMA (WCDMA) environment. Alternatively, the base stations may send cell status messages directly between each other over an interface interconnecting the base stations such as the x2 interface. The inter-base station interface can also be used to send messages directly between the base stations indicating the addition of new cells or the deletion of preexisting cells.

In one embodiment, cell outage is mitigated in a wireless communication network by automatically communicating cell status messages between radio base stations or within a node that controls the radio base stations. The cell status messages indicate whether one or more cells within the network are currently disabled or expected to be disabled. The coverage area of one or more preexisting cells within the network is modified to cover those cells which are currently disabled or expected to be disabled as indicated by the cell status messages.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 5 is a block diagram of an embodiment of a cell status message indicating cell outage in a wireless communication network.

FIG. 6 is a block diagram of another embodiment of a cell status message indicating cell outage in a wireless communication network.

FIG. 10 is a block diagram of an embodiment of a message indicating a new cell has been added within the wireless communication network of FIG. 1.

FIG. 11 is a block diagram of an embodiment of a message indicating a preexisting cell has been deleted within the wireless communication network of FIG. 1.

DETAILED DESCRIPTION

Figure 1:
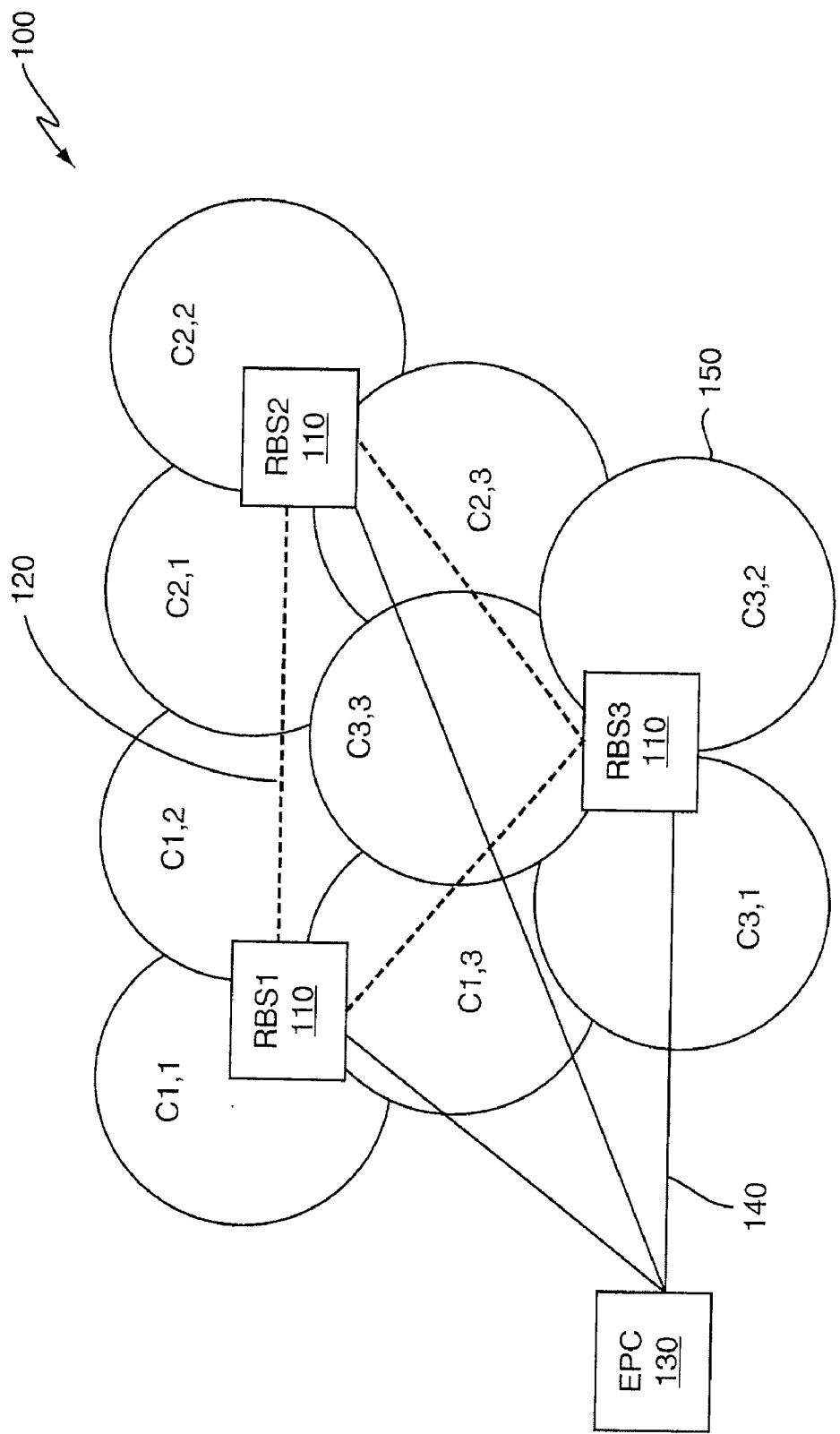
FIG. 1 is a block diagram of an embodiment of a wireless communication network including multiple radio base stations.

FIG. 1 illustrates an embodiment of a wireless communication network 100 including multiple radio base stations 110. According to this embodiment, the base stations 110 are interconnected to each other via an interface 120 such as the x2 interface which enables the base stations 110 to directly communicate with each other. Each base station 110 is also coupled to an Evolved Packet Core (EPC) network 130, e.g., corresponding to the System Architecture Evolution (SAE) architecture of 3GPP's Long Term Evolution (LTE) wireless communication standard. The base stations 110 are coupled to the EPC network 130 via any suitable interface 140 such as the S1 interface. The base stations 110 manage radio resources while the EPC network 130 provides higher-layer functionality such as managing control plane and user contexts and managing mobility for legacy systems (e.g., 2G/3G) and LTE systems.

Figure 2:
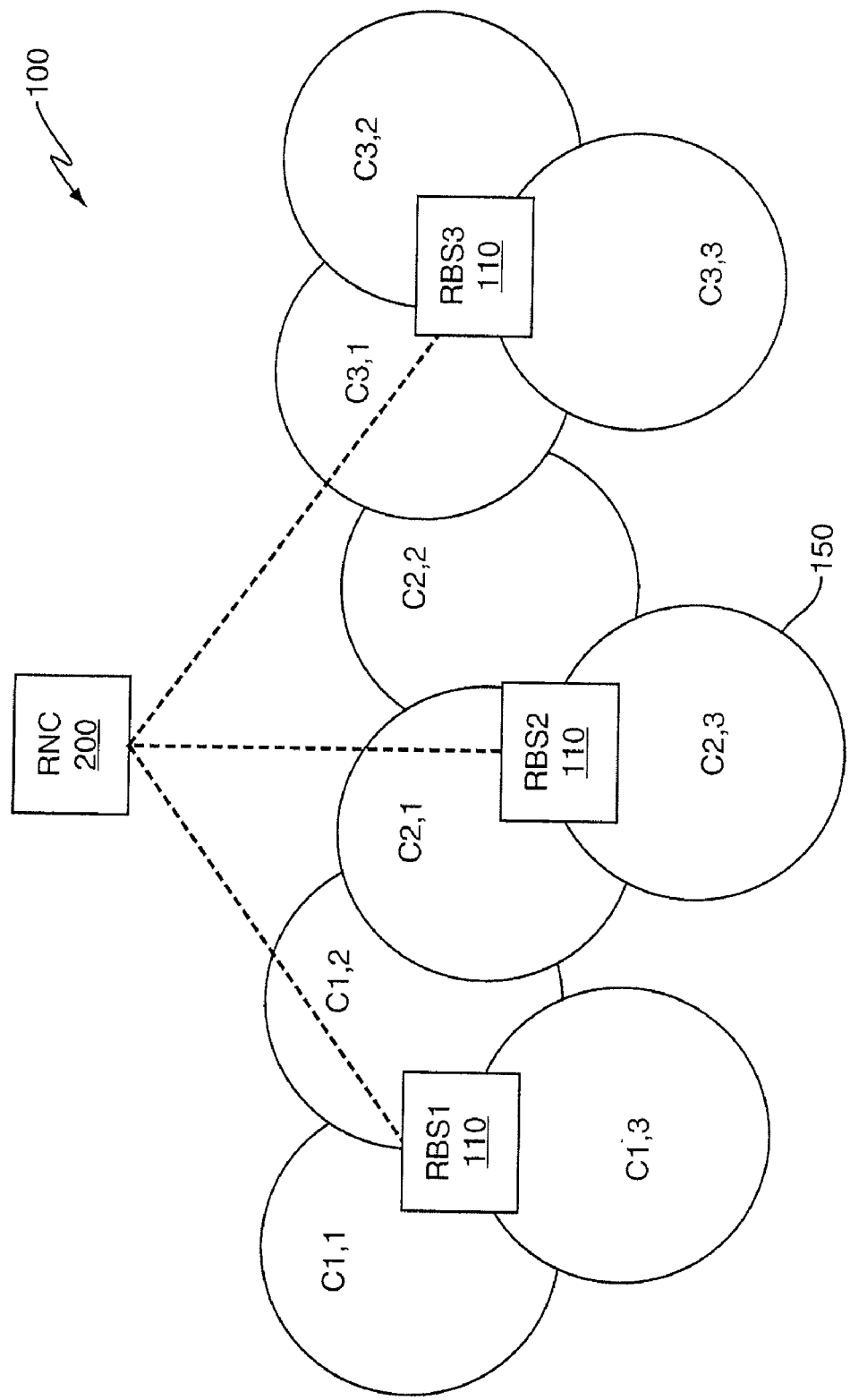
FIG. 2 is a block diagram of another embodiment of a wireless communication network including multiple radio base stations.

FIG. 2 illustrates another embodiment of the wireless communication network 100 where the radio base stations 110 operate under control of a radio network controller 200 as is commonly done in a WCDMA environment. According to this embodiment, inter-base station communication is facilitated by the radio network controller 200. Thus, the base stations 110 do not directly communicate with each other.

In either embodiment, each base station 110 provides wireless services to a particular region of the wireless network 100. Each region is further segmented into cells 150, each cell 150 covering a particular area within the wireless network 100. For illustrative purposes only, a first radio base station RBS1 services cells $C_{1.1}$, $C_{1.2}$ and $C_{1.3}$. A second radio base station RBS2 services cells $C_{2.1}$, $C_{2.2}$ and $C_{2.3}$. A third base station RBS3 services cells $C_{3.1}$, $C_{3.2}$ and $C_{3.3}$. Of course, the wireless network 100 may include any number of radio base stations 110, each servicing any number of cells 150. Seamless wireless services can be provided to mobile stations (not shown) moving throughout the wireless network 100 by handing-off the mobile stations between cells 150 (i.e., softer handoff) and between base stations 110 (i.e., soft handoff) as is well known in the art so long as cell outages are adequately mitigated.

Figure 3:
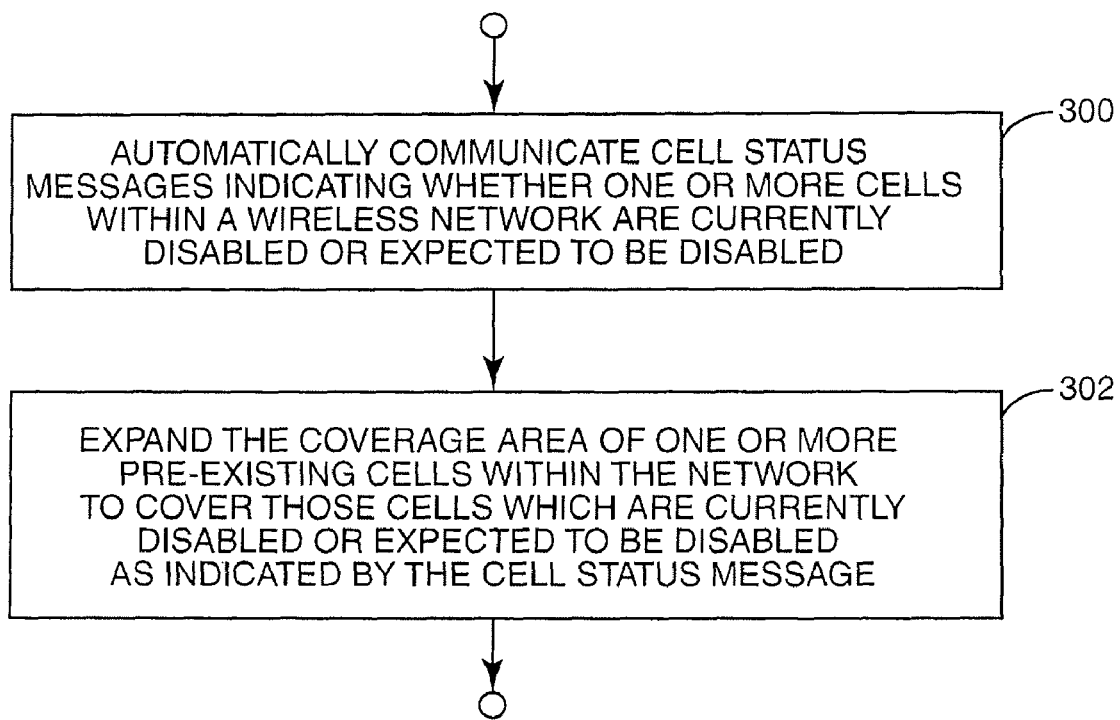
FIG. 3 is a logic flow diagram of an embodiment of processing logic for automatically mitigating cell outage in the wireless communication networks of FIGS. 1 and 2.

Cell outage is mitigated in the wireless network 100 without requiring manual operator intervention or manual base station reconfiguration, thus improving the quality of wireless services provided by the network 100. To this end, operational status of the cells 150 is routinely monitored by the base stations 110. Cell status messages indicating cell operational status are automatically generated and communicated to the base stations 110, e.g., as illustrated by Step 300 of FIG. 3. For the embodiment illustrated in FIG. 1, cell status messages are directly sent between the base stations 110 over the inter-base station interface 120 (e.g., the ×2 interface). For the embodiment illustrated in FIG. 2, cell status messages are communicated within the node that controls the base stations 110 such as within the node controlled by the radio network controller 200. Either way, the cell status messages indicate whether one or more cells 150 within the network 100 are currently disabled or expected to be disabled. The coverage area of one or more preexisting cells 150 within the network 100 can be modified without manual operator intervention to cover those cells 150 which are currently disabled or expected to be disabled as indicated by the cell status messages, e.g., as illustrated by Step 302 of FIG. 3. Automatically mitigating cell outage reduces the likelihood of wireless service interruptions, improving mobile user experience.

Figure 4:
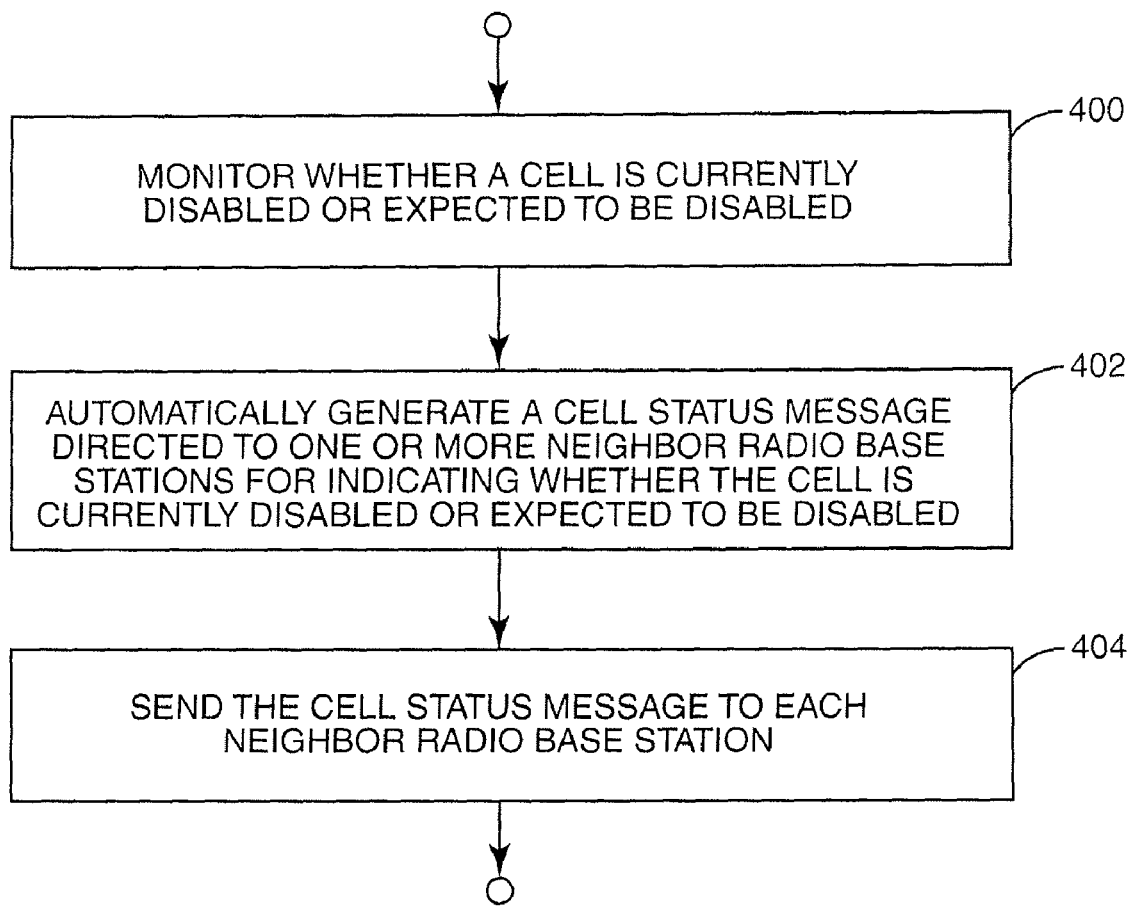
FIG. 4 is a logic flow diagram of an embodiment of processing logic for generating a cell status message indicating cell outage in a wireless communication network.

In more detail, each radio base station 110 monitors whether any cell 150 serviced by the radio base station 110 is currently disabled or expected to be disabled, e.g., as illustrated by Step 400 of FIG. 4. A cell 150 may be disabled or become disabled for various reasons. For example, some types of hardware failures within a radio base station may immediately cause cell outage while other hardware failure types eventually result in cell outage. Base station power failure also causes cell outage as do low power supplies. The radio base stations 110 monitor these conditions and/or other conditions to determine whether cell outage has occurred or is expected to occur.

Cell status messages are automatically generated based on the monitoring results, e.g., as illustrated by Step 402 of FIG. 4. The cell status messages indicate whether a particular cell or cells 150 is currently disabled or expected to be disabled. Depending on the network architecture, cell status messages are directly communicated between the base stations 110 (FIG. 1) or communicated within the node that controls the base stations 110 (FIG. 2), e.g., as illustrated by Step 404 of FIG. 4. The base stations 110 determine whether they can modify their preexisting cell coverage area to service problematic cells as indicated by the cell status messages. This way, manual operator intervention is not needed to report bad cells or mitigate cell outage. Instead, cell outage is automatically mitigated using the cell status messages.

FIG. 5 illustrates one embodiment of a cell status message. According to this embodiment, the cell status message includes a cell ID field 500, a cell position field 502 and a cell status field 504. The cell ID field 500 identifies a particular cell or cells. For example, a status message generated by the first radio base station RBS1 may contain a cell ID for cell $C_{1.1}$, $C_{1.2}$ and/or $C_{1.3}$. The cell position field 502 provides position information such as latitude, longitude and direction for each identified cell. The cell status field 504 indicates the operational status of the identified cells, i.e., whether the cells are enabled, disabled or expected to be disabled. In one embodiment, the cell status field 504 is a one bit field which is set when a cell 150 is currently disabled or expected to be disabled. Otherwise, the one-bit status field is not set to indicate cell operability.

FIG. 6 illustrates another embodiment of a cell status message. According to this embodiment, the cell status message includes the cell ID, position and status fields 500, 502, 504 illustrated in FIG. 5 and described above. The cell status message shown in FIG. 6 also has an additional field 600 listing one or more cells 150 that neighbor the cells identified in the message. For example, a status message generated by the first radio base station RBS1 may identify cell $C_{1.2}$ in the cell ID field 500. The neighbor cell field 600 identifies all cells that neighbor cell $C_{1.2}$, e.g., cell $C_{2.1}$. In one embodiment, the neighbor cell information is derived from the neighbor cell list maintained by each radio base station 110. This way, the message not only identifies a cell, its position and operational status, but also indicates which neighbor cells may be able to assist a problematic cell. A base station 110 then interrogates the neighbor cell field 600 to determine whether the base station 110 serves any of the listed neighbor cells.

Figure 7:
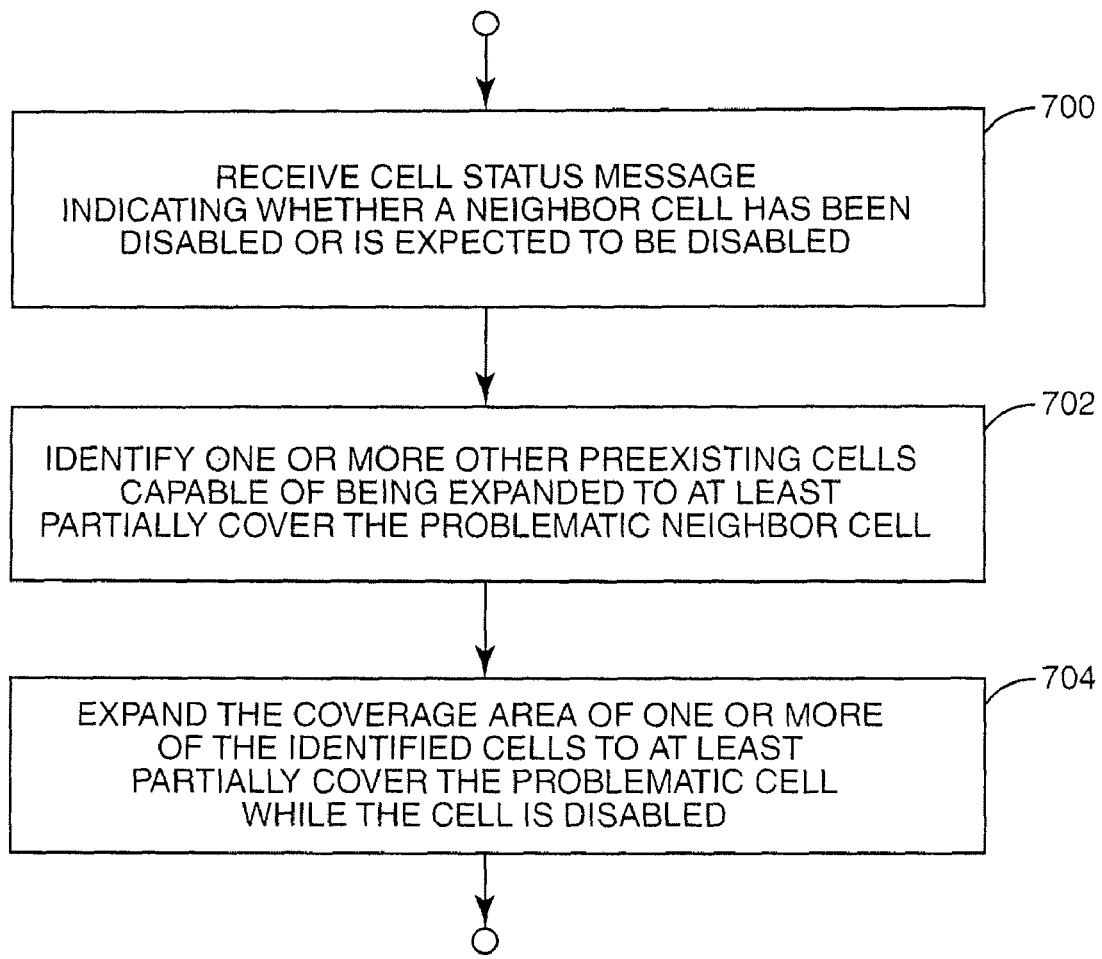
FIG. 7 is a logic flow diagram of an embodiment of processing logic for processing a cell status message indicating cell outage in a wireless communication network.

Regardless of the type of cell message employed, the messages are communicated to and received by the radio base stations 110, e.g., as illustrated by Step 700 of FIG. 7. Each base station 110 attempts to identify one or more of its preexisting cells 150 having a coverage area capable of being modified to at least partially cover one or more problematic cells identified in the status message, e.g., as illustrated by Step 702 of FIG. 7. In one embodiment, the base station 110 processes the cell status message of FIG. 5. The cell status field 504 is inspected to determine whether one or more of the identified cells is currently disabled or expected to be disabled. If so, the base station 110 extracts position information from the cell position field 502. The base station 100 uses the cell position information to determine whether one or more of its preexisting cells has a coverage area capable of being modified to at least partially cover any of the problematic cells.

In one embodiment, the base station 110 analyzes predetermined cell configuration information for the wireless network 100. This information is typically manually determined during the network planning stages and identifies the location of each cell 150 within the network 100. The base station 110 can use this information to determine whether one of its preexisting cells 150 can be modified to cover any identified problematic cells. In another embodiment, the base station 110 analyzes cell position data extracted from the cell position field 502.

Either way, the base station 110 determines whether it can help mitigate cell outage. If so, the base station 110 modifies the coverage area of one or more of its preexisting cells 150 to at least partially cover the problematic cell, e.g., as illustrated by Step 704 of FIG. 4. In one embodiment, the cell coverage area is re-shaped by adjusting the position of one or more cell antennas (not shown) to cover the problematic cell. In another embodiment, cell coverage area is expanded by increasing the cell transmit power. Regardless, one or more preexisting cells 150 fill-in for a problematic neighbor cell when the neighbor cell is disabled or expected to be disabled as indicated by a cell status message.

Figure 8:
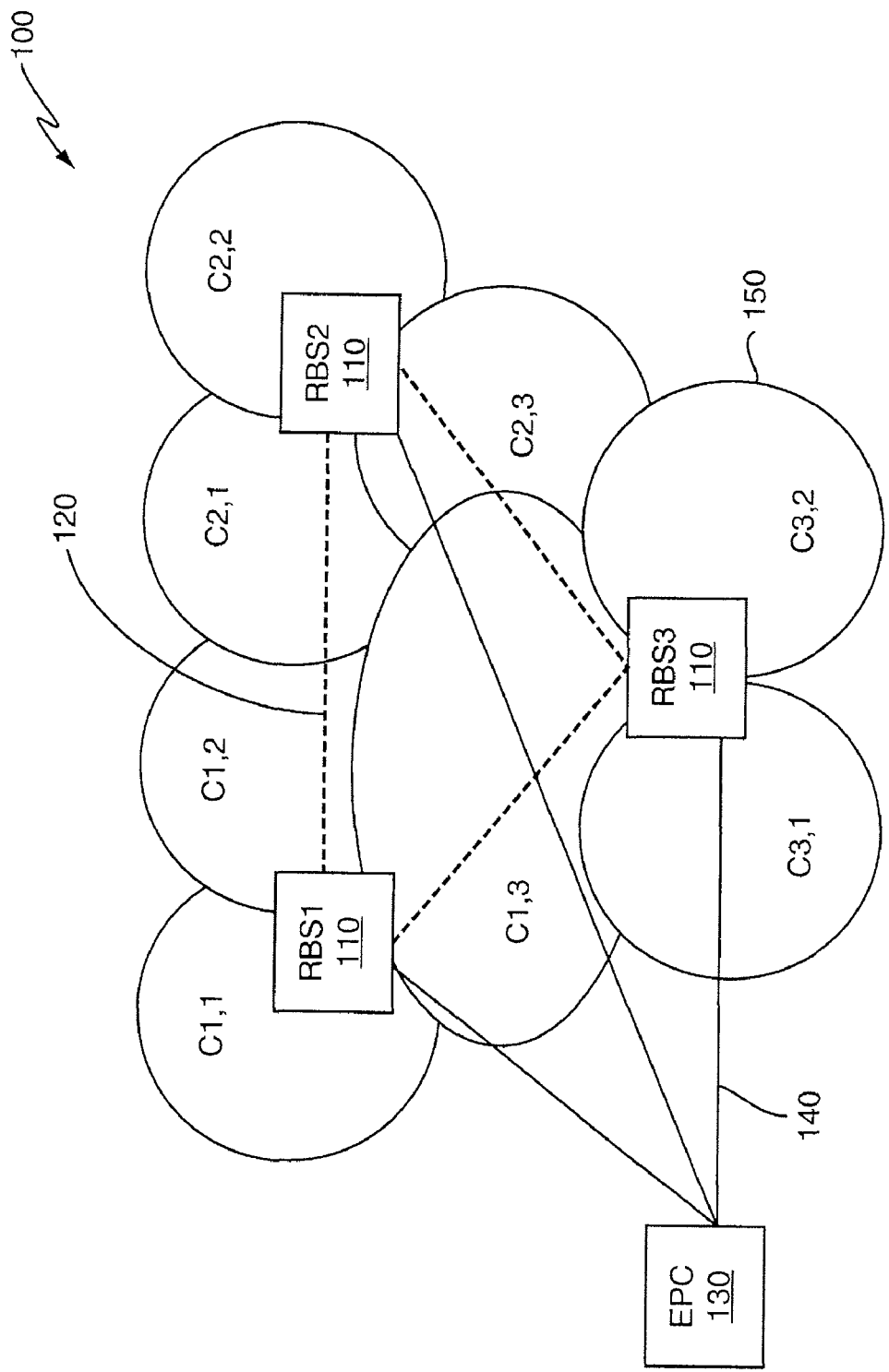
FIG. 8 is a block diagram of an embodiment of the wireless communication network of FIG. 1 after cell coverage has been modified to mitigate cell outage.
Figure 9:
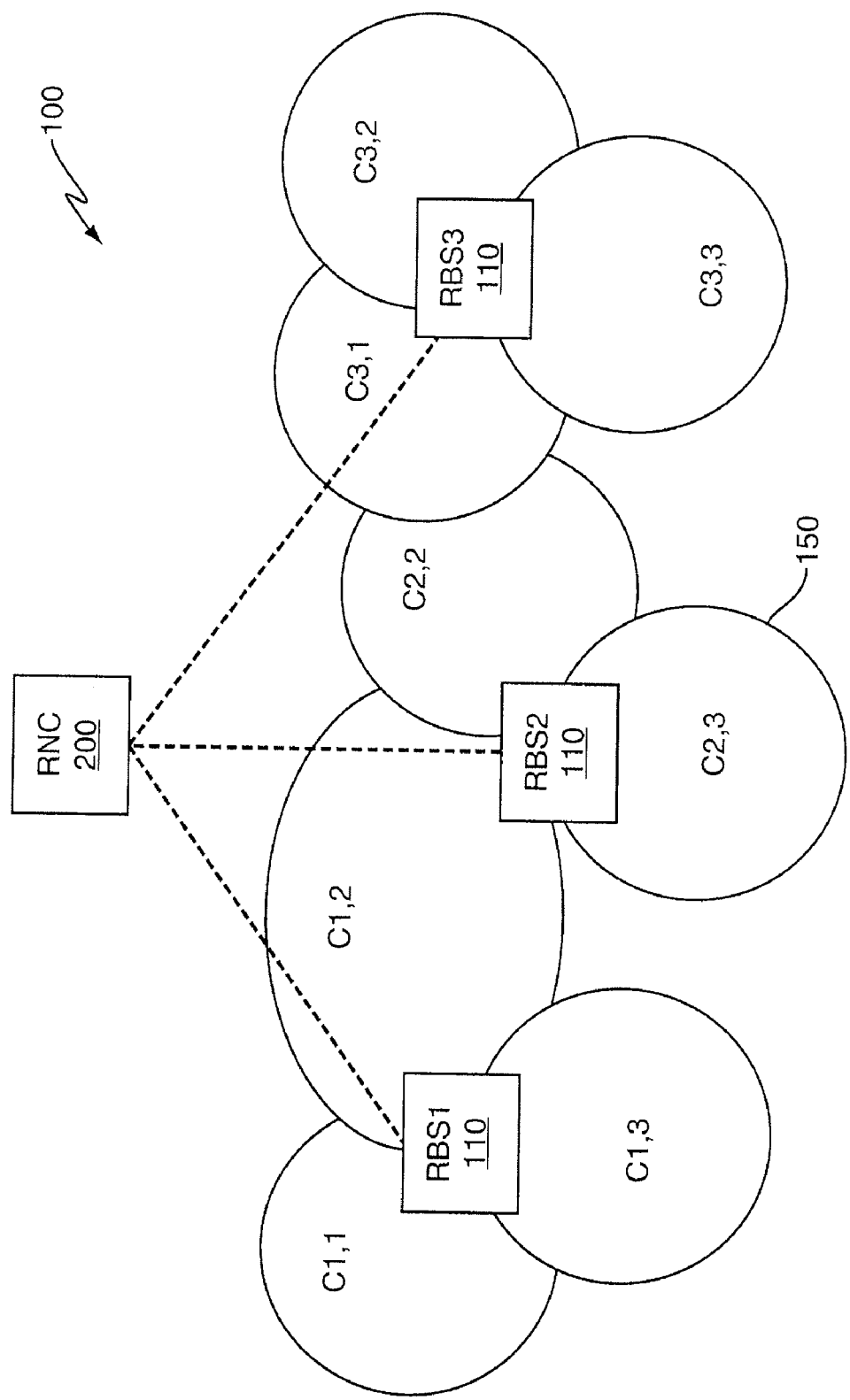
FIG. 9 is a block diagram of an embodiment of the wireless communication network of FIG. 2 after cell coverage has been modified to mitigate cell outage.

FIG. 8 illustrates the wireless network embodiment of FIG. 1 after the first radio base station RBS1 modifies the coverage area of cell $C_{1.3}$ to at least partially cover neighbor cell $C_{3.3}$. Cell $C_{3.3}$ has been disabled or is expected to be disabled as indicated by a cell status message. FIG. 9 similarly illustrates the wireless network embodiment of FIG. 2 after the first radio base station RBS1 modifies the coverage area of cell $C_{1.2}$ to at least partially cover problematic neighbor cell $C_{2.1}$. The coverage area of the other cells 150 may also be modified to mitigate the cell outage. That is other cells 150 serviced by the same or different base stations 110 may be modified to help cover any problematic cell.

The coverage area of each preexisting cell 150 whose coverage area was previously modified to mitigate cell outage is returned back to its original area responsive to a subsequent message indicating re-enablement of the problematic neighbor cell. For example, cell $C_{1.3}$ is returned to its original size as shown in FIG. 1. Cell $C_{1.2}$ is likewise returned to its original size as shown in FIG. 2. This way, cell outage is automatically mitigated without having to add cells to cover problematic cells and then subsequently delete the extra cells when the problematic cells are re-enabled. However, during the normal course of network operation, cells may be routinely added and/or deleted for other reasons, e.g., as the network expands and changes.

The inter-base station interface 120 (e.g., the ×2 interface) of FIG. 1 can be used to exchange cell addition/deletion messages directly between the radio base stations 110. In one embodiment, a new cell (not shown) is added to one of the radio base stations 110. The base station 110 determines whether one or more preexisting cells 150 serviced by a neighbor radio base station 110 qualify as a neighbor to the newly added cell. If so, the neighbor base station 110 is notified via a message communicated over the inter-base station interface 120 that the new cell may qualify as a neighbor to one or more preexisting cells 150 serviced by the neighbor base station 110.

For illustrative purposes only, new cell $C_{1.4}$ (not shown) may be added to the first radio base station RBS1 in FIG. 1. In response, the first base station RBS1 determines whether one or more preexisting cells 150 serviced by the second and third base stations RBS2 and RBS3 qualify as a neighbor to new cell $C_{1.4}$. That is, the first base station RBS1 determines whether any of cells $C_{2.1}$, $C_{2.2}$, $C_{2.3}$, $C_{3.1}$, $C_{3.2}$ and/or $C_{3.3}$ qualify as a neighbor to cell $C_{1.4}$. The first base station RBS1 may use its neighbor cell list or the predetermined cell configuration information for the wireless network 100 to determine whether any possible neighbor cell relationships exist. The first base station RBS1 can then evaluate potential neighbor cell relationships during a trial period, e.g., by evaluating handover statistics. If one or more neighbor cell relationships are confirmed during the trial period, the first base station RBS1 sends a message to the second and/or third base stations RBS2/RBS3 notifying them that cell $C_{1.4}$ may qualify as a neighbor to cells 150 serviced by those base stations 110. In another embodiment, the trial period can occur after the second and/or third base stations RBS2/RBS3 have been updated with the new cell $C_{1.4}$. Handovers between the new cell $C_{1.4}$ and cells in the second and/or third base stations RBS2/RBS3 can then be measured during the trial period to determine whether a neighbor cell relationship should be maintained with the new cell $C_{1.4}$.

FIG. 10 illustrates an embodiment of a new cell message communicated between the radio base stations 110 for indicating the addition of a new cell. A first field 1000 identifies the newly added cell. A second field 1010 identifies possible neighbor cells for the new cell. In one embodiment, the second field 1010 includes the results of the trial period evaluation discussed above. A third field 1020 contains other optional information. A base station 110 that receives such a new cell message determines whether one or more of its preexisting cells 150 qualify as a neighbor to the new cell identified in the message, e.g., by evaluating the cells identified in the second field 1010. The receiving base station 110 can perform an evaluation similar to that performed by the sending base station 110, e.g., by evaluating handover statistics during a trial period. If one or more of its cells 150 qualify as a neighbor cell, the base station 110 updates its corresponding neighbor cell list with the appropriate information.

A similar message scheme is employed when a cell is deleted. For illustrative purposes only, again consider cell $C_{1.4}$ which was previously added to the first radio base station RBS1 in FIG. 1. If cell $C_{1.4}$ is subsequently deleted, the first base station RBS1 deletes the neighbor cell list associated with cell $C_{1.4}$. The first base station RBS1 also sends a delete cell message over the inter-base station interface 120 to the base stations 110 servicing cells 150 that were neighbors to cell $C_{1.4}$ before it was deleted. This way, the neighbor base stations 110 are notified that cell $C_{1.4}$ is no longer available as a neighbor cell.

FIG. 11 illustrates an embodiment of a delete cell message communicated between the radio base stations 110 for indicating the deletion of a cell. A first field 1100 identifies the deleted cell. A second optional field 1110 contains other information. A base station 110 that receives such a delete cell message determines whether the deleted cell was a neighbor to any of its cells 150, e.g., by searching its neighbor cell lists for the cell identified in the message. If so, the identified cell is removed from the appropriate neighbor cell lists.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of mitigating cell outage in a wireless communication network, comprising:
   identifying one or more preexisting cells serviced by a first radio base station having a coverage area capable of being modified to at least partially cover a neighbor cell serviced by a second radio base station which is currently disabled or expected to be disabled as indicated by a cell status message originated from the second radio base station and received by the first radio base station; and
   modifying the coverage area of one or more of the preexisting cells to at least partially cover the neighbor cell.

2. The method of claim 1, wherein the cell status message originated from the second radio base station includes a first field identifying the neighbor cell, a second field identifying the position of the neighbor cell and a third field identifying the operational status of the neighbor cell.

3. The method of claim 2, wherein the cell status message originated from the second radio base station further includes a fourth field identifying the one or more preexisting cells serviced by the first radio base station having a coverage area capable of being modified to at least partially cover the neighbor cell.

4. The method of claim 1, further comprising returning the coverage area of each preexisting cell whose coverage area was previously modified to its original coverage area responsive to a subsequent message indicating re-enablement of the neighbor cell.

5. The method of claim 1, wherein the cell status message is received by the first radio base station from a preexisting interface interconnecting the first and second radio base stations.

6. The method of claim 5, further comprising:
determining whether one or more preexisting cells serviced by the second radio base station qualify as a neighbor to a new cell serviced by the first radio base station; and
notifying the second radio base station via the preexisting interface that the new cell may qualify as a neighbor to one or more of the preexisting cells serviced by the second radio base station.

7. The method of claim 5, further comprising:
deleting a preexisting cell serviced by the first radio base station; and
notifying the second radio base station via the preexisting interface that the deleted cell is no longer available as a neighbor to cells serviced by the second radio base station.

8. A radio base station in a wireless communication system, said radio base station configured to:
identify one or more preexisting cells serviced by the radio base station having a coverage area capable of being modified to at least partially cover a neighbor cell serviced by another radio base station which is currently disabled or expected to be disabled as indicated by a cell status message originated from the other radio base station and received by the radio base station; and
modify the coverage area of one or more of the preexisting cells to at least partially cover the neighbor cell.

9. The radio base station of claim 8, wherein the cell status message originated from the other radio base station includes a first field identifying the neighbor cell, a second field identifying the position of the neighbor cell and a third field identifying the operational status of the neighbor cell.

10. The radio base station of claim 9, wherein the cell status message originated from the other radio base station further includes a fourth field identifying the one or more preexisting cells serviced by the radio base station having a coverage area capable of being modified to at least partially cover the neighbor cell.

11. The radio base station of claim 8, wherein the radio base station is further configured to return the coverage area of each preexisting cell whose coverage area was previously modified to its original coverage area responsive to a subsequent message indicating re-enablement of the neighbor cell.

12. The radio base station of claim 8, wherein the cell status message is received by the radio base station from a preexisting interface interconnecting the radio base station to a neighbor radio base station configured to service the neighbor cell.

13. The radio base station of claim 12, wherein the radio base station is further configured to:
determine whether one or more preexisting cells serviced by the neighbor radio base station qualify as a neighbor to a new cell serviced by the radio base station; and
notify the neighbor radio base station via the preexisting interface that the new cell may qualify as a neighbor to one or more of the preexisting cells serviced by the neighbor radio base station.

14. The radio base station of claim 12, wherein the radio base station is further configured to:
delete a preexisting cell serviced by the radio base station; and
notify the neighbor radio base station via the preexisting interface that the deleted cell is no longer available as a neighbor to cells serviced by the neighbor radio base station.

15. A method of mitigating cell outage in a wireless communication network, comprising:
monitoring at a radio base station whether a cell serviced by the radio base station is currently disabled or expected to be disabled;
automatically generating a cell status message at the radio base station indicating whether the cell is currently disabled or expected to be disabled; and
sending the cell status message to one or more neighbor radio base stations.

16. The method of claim 15, wherein monitoring at a radio base station whether a cell serviced by the radio base station is currently disabled or expected to be disabled comprises monitoring for at least one of hardware failure associated with the radio base station, power loss, and low battery power.

17. The method of claim 15, wherein the cell status message includes cell ID, position and operational status fields for each cell being monitored.

18. The method of claim 15, wherein sending the cell status message to the one or more neighbor radio base stations comprises sending the cell status message over a preexisting interface interconnecting the radio base stations.

19. The method of claim 18, further comprising:
determining whether one or more preexisting cells serviced by the neighbor radio base stations qualify as a neighbor to a new cell serviced by the radio base station; and
notifying the neighbor radio base stations via the preexisting interface that the new cell may qualify as a neighbor to one or more of the preexisting cells serviced by the neighbor radio base stations.

20. The method of claim 18, further comprising:
deleting a preexisting cell serviced by the radio base station; and
notifying the neighbor radio base stations via the preexisting interface that the deleted cell is no longer available as a neighbor to cells serviced by the neighbor radio base stations.

21. A radio base station in a wireless communication system, said radio base station configured to:
monitor at the radio base station whether a cell serviced by the radio base station is currently disabled or expected to be disabled;
automatically generate a cell status message at the radio base station indicating whether the cell is currently disabled or expected to be disabled; and
send the cell status message to one or more neighbor radio base stations.

22. The radio base station of claim 21, wherein the radio base station is configured to send the cell status message over a preexisting interface interconnecting the radio base stations.

23. The radio base station of claim 22, wherein the radio base station is further configured to:
determine whether one or more preexisting cells serviced by the neighbor radio base stations qualify as a neighbor to a new cell serviced by the radio base station; and notify the neighbor radio base stations via the preexisting interface that the new cell may qualify as a neighbor to one or more of the preexisting cells serviced by the neighbor radio base stations.

24. The radio base station of claim 22, wherein the radio base station is further configured to:

delete a preexisting cell serviced by the radio base station; and notify the neighbor radio base stations via the preexisting interface that the deleted cell is no longer available as a neighbor to cells serviced by the neighbor radio base stations.

\* \* \* \* \*